(12) United States Patent
Seki

(10) Patent No.: US 12,389,106 B2
(45) Date of Patent: Aug. 12, 2025

(54) IMAGING APPARATUS, CONTROL METHOD FOR THE SAME, AND STORAGE MEDIUM

(71) Applicant: CANON KABUSHIKI KAISHA, Tokyo (JP)

(72) Inventor: Takashi Seki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 111 days.

(21) Appl. No.: 18/524,862

(22) Filed: Nov. 30, 2023

(65) Prior Publication Data
US 2024/0179395 A1    May 30, 2024

(30) Foreign Application Priority Data
Nov. 30, 2022    (JP) .................................. 2022-191865

(51) Int. Cl.
*H04N 23/62*    (2023.01)
*H04N 5/77*    (2006.01)
*H04N 23/63*    (2023.01)

(52) U.S. Cl.
CPC ............. *H04N 23/62* (2023.01); *H04N 5/77* (2013.01); *H04N 23/631* (2023.01)

(58) Field of Classification Search
CPC ........ H04N 5/77; H04N 23/631; H04N 23/62; H04N 23/623481
USPC .................................................... 348/333.02
See application file for complete search history.

(56) References Cited

U.S. PATENT DOCUMENTS

| | | | | |
|---|---|---|---|---|
| 8,149,313 B2 * | 4/2012 | Watanabe | ............ | H04N 23/611 348/333.12 |
| 2004/0246358 A1 * | 12/2004 | Isoyama | ............... | H04N 23/667 348/333.01 |
| 2015/0036003 A1 * | 2/2015 | Sakurai | .................. | H04N 5/772 348/207.11 |

FOREIGN PATENT DOCUMENTS

| | | | |
|---|---|---|---|
| JP | 2005184348 A | * | 7/2005 |
| JP | 2014002231 A | | 1/2014 |

* cited by examiner

*Primary Examiner* — Lin Ye
(74) *Attorney, Agent, or Firm* — Canon U.S.A., Inc. IP Division

(57) ABSTRACT

An imaging apparatus includes an image recording unit configured to record an image captured and obtained by an imaging unit, a storage unit configured to store an imaging setting when the image recording unit records the image as an imaging setting history, the storage unit being configured to store a plurality of imaging setting histories, an operation member, and an assignment unit configured to assign the operation member a function of calling the imaging setting of one of the imaging setting histories stored in the storage unit based on a user operation. The assignment unit is configured to assign the operation member a function of calling the imaging setting of a latest imaging setting history upon operation of the operation member among the imaging setting histories stored in the storage unit.

20 Claims, 6 Drawing Sheets

IMAGING APPARATUS, CONTROL METHOD FOR THE SAME, AND STORAGE MEDIUM

BACKGROUND

Technical Field

The present disclosure relates to an imaging apparatus, a control method for the imaging apparatus, and a storage medium.

Description of the Related Art

There is known a function of storing imaging settings in starting to capture an image, and reproducing the stored imaging settings upon button operation as discussed in Japanese Patent Application Laid-Open No. 2014-2231.

If a frequent change of imaging setting parameters is desirable due to frequent scene switching, the imaging setting parameters used in the previous imaging are sometimes restored for imaging. In such a case, the imaging setting parameters previously used can be restored by keeping a history of imaging setting parameters and reproducing the imaging setting parameters from the history.

To reproduce imaging setting parameters using a stored history, the user needs to check histories and select the imaging setting parameters by operating a menu, which is an issue of requiring a lot of manual operations.

SUMMARY

The present disclosure is directed to providing an imaging apparatus that can easily reproduce the imaging settings used the last time.

According to an aspect of the present disclosure, an imaging apparatus includes an image recording unit configured to record an image captured and obtained by an imaging unit, a storage unit configured to store an imaging setting when the image recording unit records the image as an imaging setting history, the storage unit being configured to store a plurality of imaging setting histories, an operation member, and an assignment unit configured to assign the operation member a function of calling the imaging setting of one of the imaging setting histories stored in the storage unit based on a user operation. The assignment unit is configured to assign the operation member a function of calling the imaging setting of a latest imaging setting history upon operation of the operation member among the imaging setting histories stored in the storage unit.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings. An exemplary embodiment will be described by using a case where an electronic apparatus is a digital video camera 10 (imaging apparatus) as an example.

<Hardware Configuration>

Figure 1:
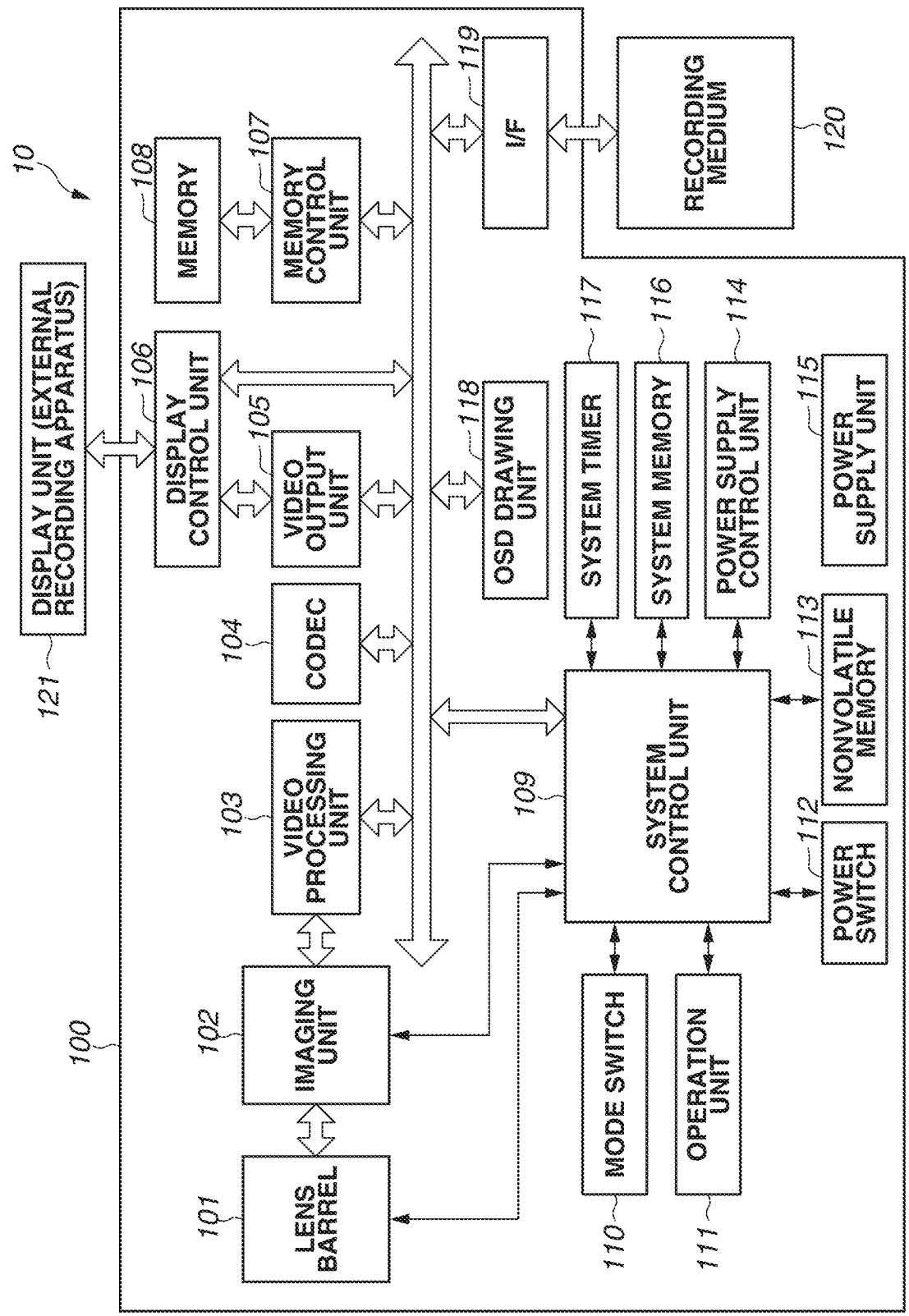
FIG. 1 is a block diagram illustrating the configuration of a digital video camera according to an exemplary embodiment of the present disclosure.

FIG. 1 is a block diagram illustrating a configuration of the digital video camera 10 that is an example of the imaging apparatus according to the exemplary embodiment of the present disclosure. A housing 100 accommodates various elements to be described below.

A lens barrel 101 includes imaging lenses including a focus lens and an image stabilization lens, and a diaphragm mechanism. The lens barrel 101 may be integrated with the housing 100 or configured to be separable from the housing 100.

An imaging unit 102 includes an image sensor and an analog-to-digital converter. The image sensor converts an optical image formed by collecting light using the imaging lenses included in the lens barrel 101 into an analog electrical signal. The A/D converter converts the analog electrical signal into a digital signal (video data). The video data thus obtained is input from the imaging unit 102 to a video processing unit 103.

The video processing unit 103 performs predetermined image processing, such as resize processing, trimming processing, color conversion processing, and distortion correction processing, on the video data from the imaging unit 102 or a memory control unit 107, and generates a video random access memory (VRAM) on a memory 108 via the memory control unit 107. The video processing unit 103 also performs predetermined calculation processing on the video data and supplies the calculation results to a system control unit 109. The calculation results are used for various types of control processing including exposure control, ranging control, and image stabilization control. For example, automatic focus (AF) processing, automatic exposure (AE) processing, and image stabilization processing are performed based on the result of object detection that is calculation by the video processing unit 103. The video processing unit 103 can also perform automatic white balance (AWB) processing based on calculation on the video data.

A codec 104 encodes the VRAM generated by the video processing unit 103 based on a predetermined moving image compression method (such as Moving Picture Experts Group [MPEG]-2 and H.264). The codec 104 also decodes encoded video data supplied from the memory control unit 107 and generates a new VRAM. The video processing unit 103 performs predetermined image processing on the new VRAM and supplies the result to the memory control unit 107.

A video output unit 105 overlaps a plurality of VRAMs read from the memory 108 via the memory control unit 107 to generate a video signal. The video output unit 105 can attach metadata identified by the system control unit 109 to the foregoing video signal. The video output unit 105 can generate different video signals and output the video signals to a plurality of respective display units 121 independently of each other.

A display unit 121 is a display device connected to the digital video camera 10, and displays an input video signal. The display unit 121 can include a plurality of display devices. The display unit 121 may include a display member, such as a liquid crystal panel and an organic electroluminescence (EL) panel. Alternatively, the display unit 121 may be an external recording apparatus for recording the video signal outside the digital video camera 10.

A display control unit 106 establishes connection with the display unit 121 and outputs the video signal to the display unit 121. The digital video camera 10 and the display unit 121 can be connected in conformity with a Serial Digital Interface (SDI) standard, for example. The digital video camera 10 and the display unit 121 may be connected in a wired or wireless manner using other techniques. For example, the digital video camera 10 and the display unit 121 may be connected to each other via a High-Definition Multimedia Interface (HDMI®) cable, and transmit and receive video signals and signal standard information. The digital video camera 10 and the display unit 121 may be connected over a wireless local area network (LAN).

The memory control unit 107 arbitrates access requests to the memory 108 from various components.

The memory 108 stores VRAMs for the video processing unit 103, the codec 104, the video output unit 105, and an onscreen display (OSD) drawing unit 118 to handle. The memory 108 can also temporarily store encoded video data output from the codec 104 and encoded video data read from a recording medium 120. The memory 108 has a recording capacity sufficient to store a predetermined duration of moving image and sound.

The system control unit 109 is a control unit that controls the entire digital video camera 10 in a comprehensive manner. For example, the system control unit 109 includes an arithmetic processor, such as a central processing unit (CPU). The system control unit 109 may include a plurality of CPU cores. The plurality of CPU cores can process tasks written in a program to be described below in a shared manner.

The nonvolatile memory 113 is an electrically recordable and erasable recording medium. Programs to be used by the system control unit 109 and control information, such as parameters, are recorded in the nonvolatile memory 113. The programs include a program for performing processing illustrated in the flowchart to be described below.

A system memory 116 is a volatile recording medium and includes a random-access memory (RAM), for example. The system memory 116 may be common to the memory 108. In such a case, a small-capacity memory capable of high-speed access (such as a cache memory) may be directly connected to the system control unit 109 since access to the memory 108 serving as the system memory 116 is arbitrated by the memory control unit 107.

The system control unit 109 controls the components of the digital video camera 10 to implement various operations of the present exemplary embodiment by loading the programs, operating variables, and constants stored in the nonvolatile memory 113 into the system memory 116 and running the programs. The system control unit 109 can control display operation through the memory 108, the OSD drawing unit 118, and the video output unit 105.

The mode switch 110 is a switch used to select an operation mode of the digital video camera 10. The operation mode (such as a camera mode and a playback mode) specified by the position of the switch is notified to the system control unit 109.

The operation unit 111 refers to operation members used to make user operations for inputting various instructions to the system control unit 109. For example, the operation unit 111 includes the following operation members:

Menu button for displaying a menu screen for making various settings on the display unit 121
Cancel button
Directional pad (up, down, left, and right keys)
Set button
Function switch button (such as an AF/manual focus [MF] button)
Recording (REC) button for giving instructions to start and stop moving image recording
Assignment buttons to which given functions can be assigned by menu setting The user can intuitively issue various setting instructions by using the menu screen displayed on the display unit 121, the directional pad, and the set button. The user may issue recording start and stop instructions for the display unit 121 (external recording apparatus) to record the video signal by operating the REC button.

A power switch 112 is a push button used to switch between a power-on state and a power-off state.

A power supply control unit 114 includes a battery detection circuit, a direct-current-to-direct-current (DC-DC) converter, and a switch circuit for switching blocks to be energized. The power supply control unit 114 detects whether a battery is attached, the type of the attached battery, and the remaining battery level. Based on the detection results and instructions from the system control unit 109, the power supply control unit 114 controls the DC-DC converter to supply predetermined operating voltages to various components (such as the recording medium 120) for predetermined periods.

A power supply unit 115 includes at least one of a primary battery (such as an alkali battery and a lithium battery), a secondary battery (such as a nickel-cadmium [NiCd] battery, a nickel metal halide [NiMH] battery, and a lithium ion [Li] battery), and an alternating-current (AC) adaptor.

A system timer 117 is a timing generation unit to be used for various types of control and a clocking unit for measuring the time of a not-illustrated built-in clock. The system control unit 109 controls operation of various components based on timing generated by the system timer 117.

The OSD drawing unit 118 provides an OSD function of superimposing setting information on video data. More specifically, the OSD drawing unit 118 renders character strings and icons representing the state and settings of the digital video camera 10, and various display frames and markers (i.e., OSD) on the VRAMs stored in the memory 108. Display information about the character strings and icons used in the OSD function is stored in the nonvolatile memory 113 and read into the OSD drawing unit 118 as appropriate.

An interface (I/F) 119 is a connection I/F with the recording medium 120 connectable to the digital video camera 10.

The recording medium 120 is a recording medium for recording encoded video data and data accompanying the video data in the form of image files. The encoded video image stored in the memory 108 is supplied to and recorded on the recording medium 120 via the I/F 119. The encoded video data and the accompanying data recorded on the recording medium 120 are read by the I/F 119 and transferred to the memory 108. The recording medium 120 may be a medium detachably attached to the digital video camera 10 (such as a memory card, a hard disk drive [HDD], and other discs), or a medium built in the digital video camera 10 (such as a flash memory and an HDD).

The digital video camera 10 according to the present exemplary embodiment can store imaging parameters as an imaging setting history. The imaging parameters of the stored imaging setting history can be called and set to the digital video camera 10. When imaging is started or ended by operating the REC button 131, the system control unit 109 stores the currently set imaging parameters into the memory 108. In case of an instantaneous outage, the imaging parameters may be stored in the nonvolatile memory 113.

The imaging parameters stored as an imaging setting history can be called and set to the digital video camera 10, for example, by operating a menu displayed on the display unit 121. A function of reading the imaging parameters stored as an imaging setting history and setting the imaging parameters to the digital video camera 10 can be registered in a given assignment button. Once the imaging parameters stored as an imaging setting history are registered with the assignment button, the user can subsequently call the imaging setting history with a single touch by operating the registered assignment button without menu operation.

<Processing Related to Imaging Setting History>

Figure 2:
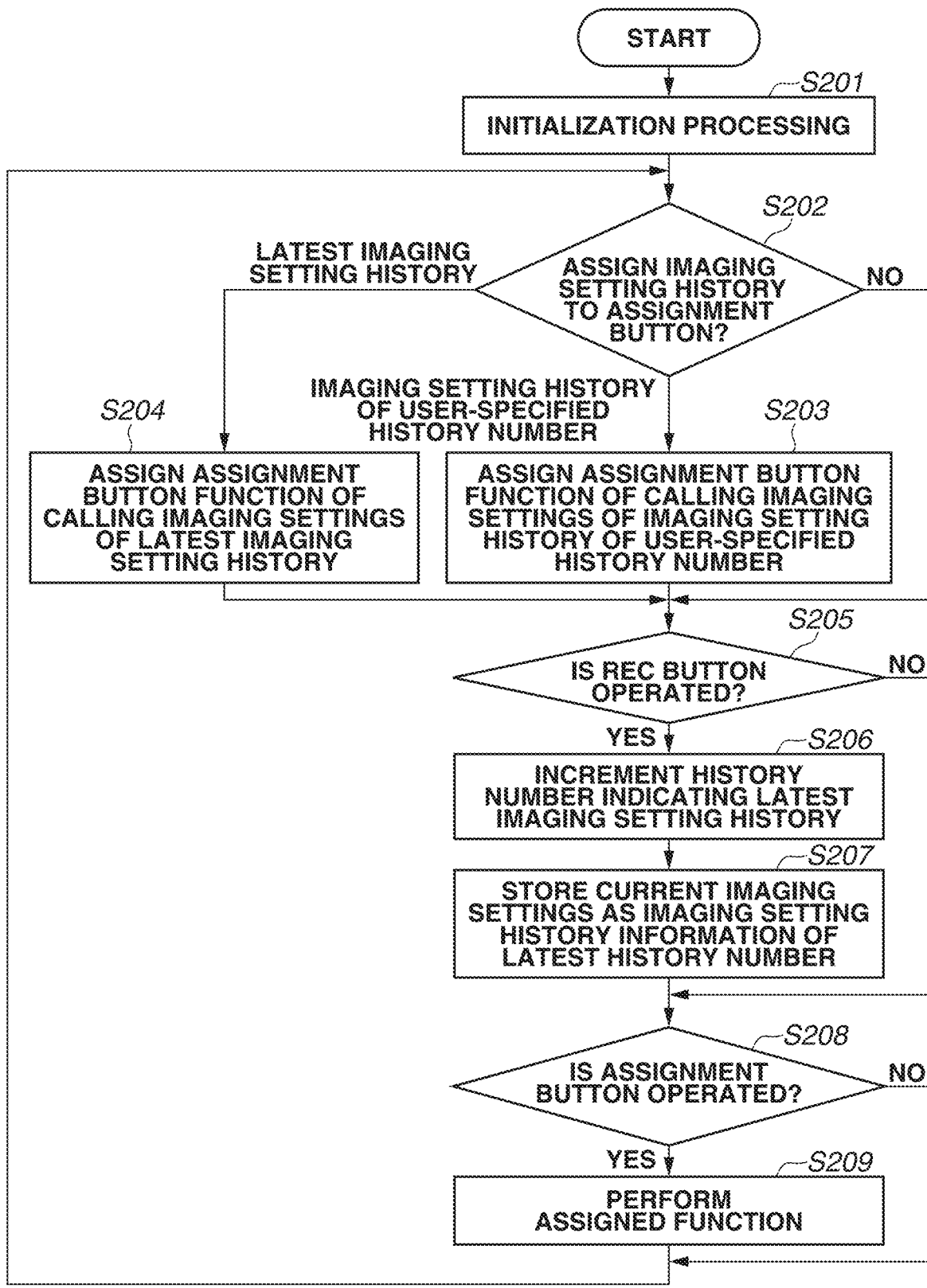
FIG. 2 is a flowchart illustrating processing related to an imaging setting history of a digital video camera.

FIG. 2 is a flowchart illustrating processing related to the imaging setting history by the digital video camera 10.

In step S201, the system control unit 109 reads imaging setting history information (imaging history numbers and pieces of imaging setting [imaging parameter] information registered with the respective imaging history numbers) and assignment information upon the previous shutdown from the nonvolatile memory 113, and stores the imaging setting history information and the assignment information into the system memory 116. When the digital video camera 10 is activated for the first time, the imaging setting history information is null, and the assignment information reflects a predetermined initial value. The assignment information is information for identifying the functions assigned to the assignment buttons. The assignment buttons can be assigned not only the function of calling imaging settings based on an imaging setting history and applying the imaging settings to the digital video camera 10 but other functions as well. The processing proceeds to step S202.

In step S202, the system control unit 109 determines whether the user makes a setting to assign an imaging setting history assignment setting to an assignment button. The user can make the setting to assign an imaging setting history to an assignment button using an imaging setting history screen.

Now, the setting to assign an imaging setting history to an assignment button will be described with reference to FIGS. 3A to 3H.

FIGS. 3A to 3H are diagrams illustrating the imaging setting history screen that is one of menu screens. The imaging setting history screen of FIGS. 3A to 3H is displayed on the display unit 121 under the control of the system control unit 109 and the display control unit 106, based on various types of information, such as the imaging setting history information and the assignment information stored in the system memory 116. The imaging setting history screen displays icons or items indicating various types of information, imaging setting information 322, and an assignment menu 320.

A menu screen 300 illustrated in FIGS. 3A to 3H represents a menu screen of the digital video camera 10. The menu is categorized and the categories can be switched using category icons 301 to 306. The menu screen 300 may be displayed on the entire display unit 121 for high menu operability. The menu screen 300 may be superimposed on a live-view image displayed on the display unit 121 so that both can be observed.

The menu screen 300 includes a plurality of menu icons including an imaging setting icon 301, a sound setting icon 302, a network setting icon 303, a main body setting icon 304, a user customization menu icon 305, and an imaging setting history icon 306, all of which are category icons, and a close menu icon 307. A menu icon selected may be displayed in a different color from the other icons to clearly show the selection, like the imaging setting history icon 306. FIGS. 3A to 3H illustrate a state where with the imaging setting history icon 306 selected, the imaging setting history screen is displayed.

The imaging setting history screen displays imaging setting history (1) 311, imaging setting history (2) 312, imaging setting history (3) 313, imaging setting history (4) 314, and imaging setting history (5) 315. The user can select one of the displayed imaging setting histories (1) to (5) 311 to 315 on this screen by operating the up and down keys of the operation unit 111.

Figure 3A:
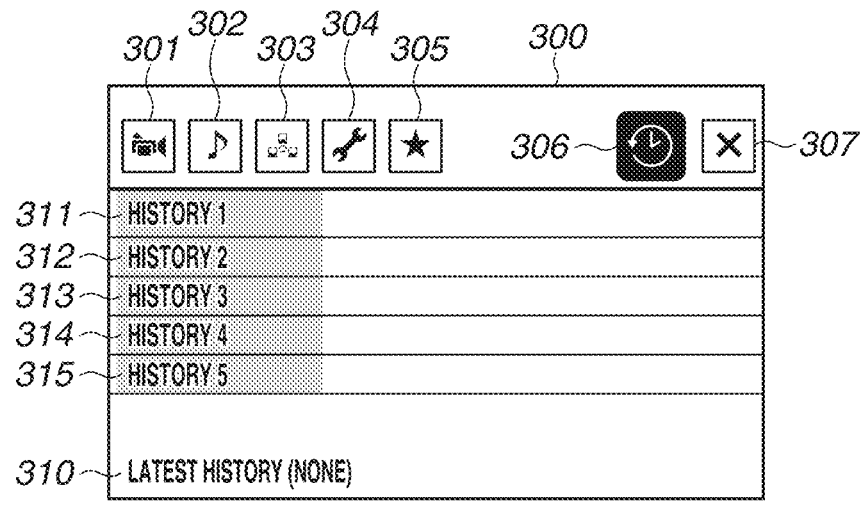
FIGS. 3A to 3H illustrate examples of an imaging setting history screen.
Figure 3B:
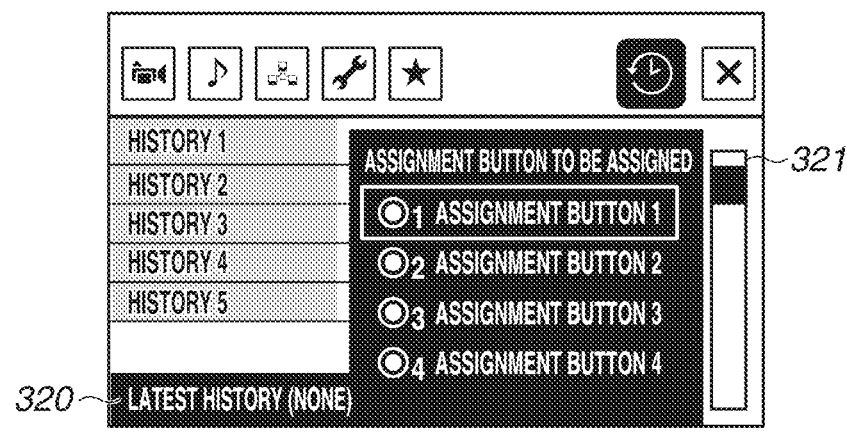
Figure 3C:
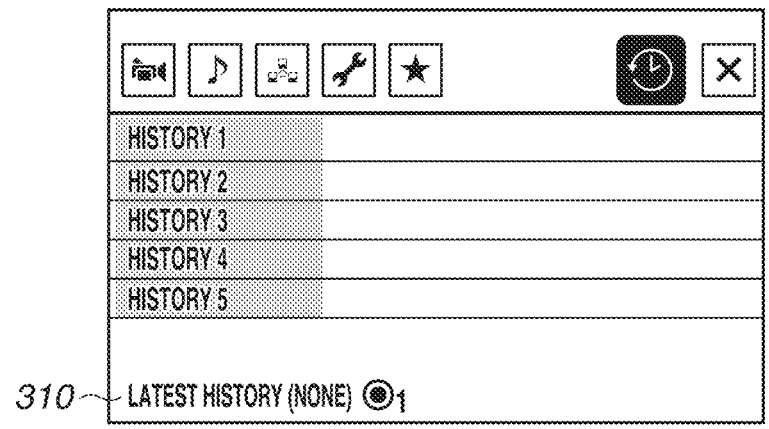

FIGS. 3A, 3B, and 3C illustrate a state where imaging settings are not registered with any of imaging setting histories (1) to (5) 311 to 315. For the sake of distinction, the imaging setting histories can be changed in character color, background color, or brightness depending on the presence or absence of imaging settings. For example, the brightness is lowered if imaging settings are not registered, and increased if imaging settings are registered. As illustrated in FIGS. 3D to 3H, whether imaging settings are registered in imaging setting histories (1) to (5) 311 to 315 may be showed by displaying the date and time of registration of imaging settings (start date and time of imaging) if there are registered imaging settings.

The imaging setting history screen also displays a latest imaging history 310 indicating the latest state of the imaging setting histories. In FIGS. 3A to 3C, the latest imaging history 310 displays "none" since there is no imaging setting history registered. In FIGS. 3D to 3G, imaging settings are registered only with imaging setting history (1), and the latest imaging history 310 provides display of imaging setting history (1) as the latest imaging setting history. In FIG. 3H, imaging settings are registered with imaging setting histories (1) and (2), and the latest imaging history 310 provides display of imaging setting history (2) as the latest imaging setting history.

On the imaging setting history screen, the assignment buttons can be assigned the function of reading registered imaging settings and setting the imaging settings to the digital video camera 10 as to each of imaging setting histories (1) to (5). The digital video camera 10 according to the present exemplary embodiment can assign the assignment buttons not only imaging setting histories (1) to (5) 311 to 315 but the latest imaging history 310 as well.

On the imaging setting history screen, the user can select the latest imaging history 310 by using the directional pad of the operation unit 111. If the latest imaging history 310 is selected and the set button of the operation unit 111 is pressed, the assignment menu 320 is displayed as illustrated in FIG. 3B. The function of calling the imaging settings of the selected imaging setting history can be assigned to the assignment button by a user operation on the assignment menu 320. The assignment menu 320 displays a plurality of items for selecting the assignment buttons (assignment buttons 1 to 4). If the user selects an assignment button to assign the latest imaging setting history with the directional pad and presses the set button, the processing of step S204 to be described below is performed and the function of calling the imaging settings of the latest imaging setting history is assigned to the selected assignment button.

FIG. 3C is the imaging setting history screen in a state where the latest imaging setting history is assigned to an assignment button 1. Displaying an icon representing the assignment button 1 on the right of the latest imaging history 310 enables the user to find out that the latest imaging history 310 is assigned to an assignment button and which the assigned assignment button is. In the state where no imaging setting history is registered (imaging setting history information stored in the system memory 116 is null) like FIGS. 3A to 3C, the system control unit 109 can assign the latest imaging setting history to an assignment button. Since the imaging setting history to be called as the latest imaging setting history in response to the operation of the assignment button changes each time an image is recorded, the latest imaging history can be assigned to an assignment button even with no imaging setting history registered. By contrast, the system control unit 109 disables assignment of imaging setting histories (1) to (5) to the assignment buttons if no imaging setting history is registered, since imaging setting histories (1) to (5) are intended to assign the user's favorite imaging setting histories to the assignment buttons.

Figure 3D:
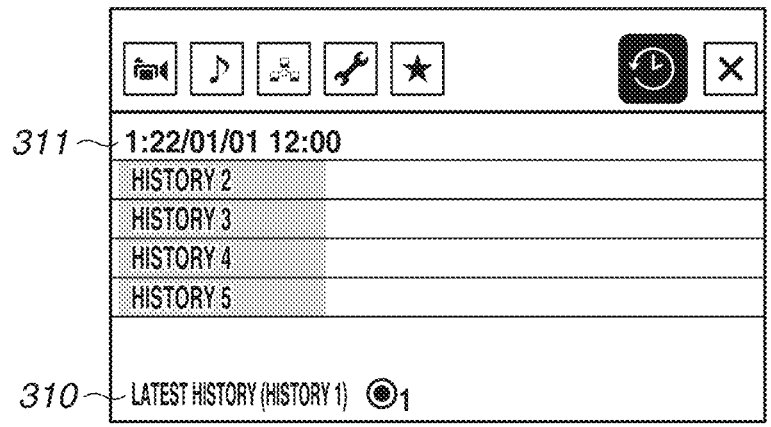
Figure 3E:
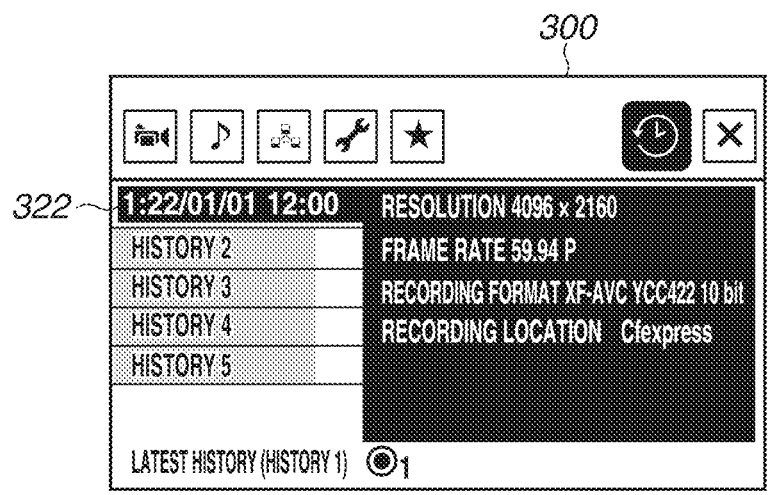

FIG. 3D illustrates the imaging setting history screen in a state after FIG. 3C, where imaging is started and the imaging settings are registered with imaging setting history (1) 311. When imaging is performed, the imaging settings are registered with imaging setting history (1) 311 through the processing of steps S206 and S207 to be described below. Here, the brightness of imaging setting history (1) 311 is increased and the date and time of imaging is displayed since a history occurs. If the user operates the directional pad in the state of FIG. 3D to select imaging setting history (1) 311, the imaging setting information 322 (such as a recording format, resolution, frame rate, codec, and recording location [built-in medium or external recording medium]) registered with the selected imaging setting history is displayed as illustrated in FIG. 3E. If the latest imaging history 310 is selected, the imaging setting information about the latest imaging setting history may be displayed as well.

Figure 3F:
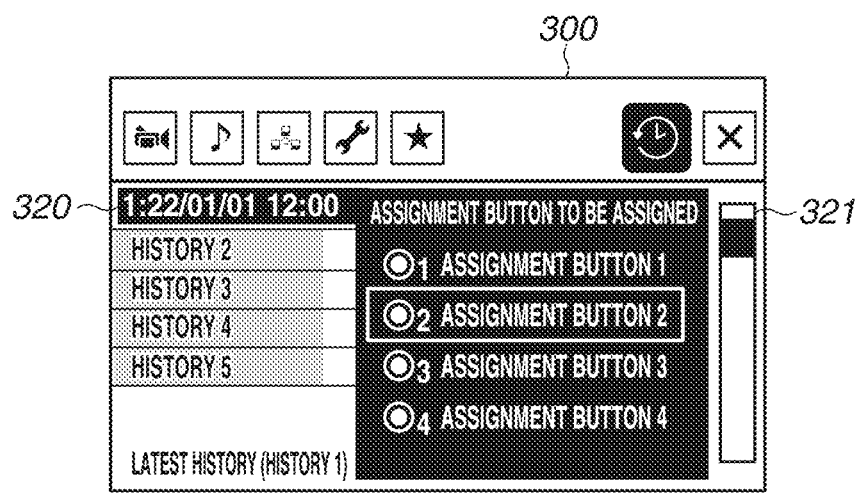
Figure 3G:
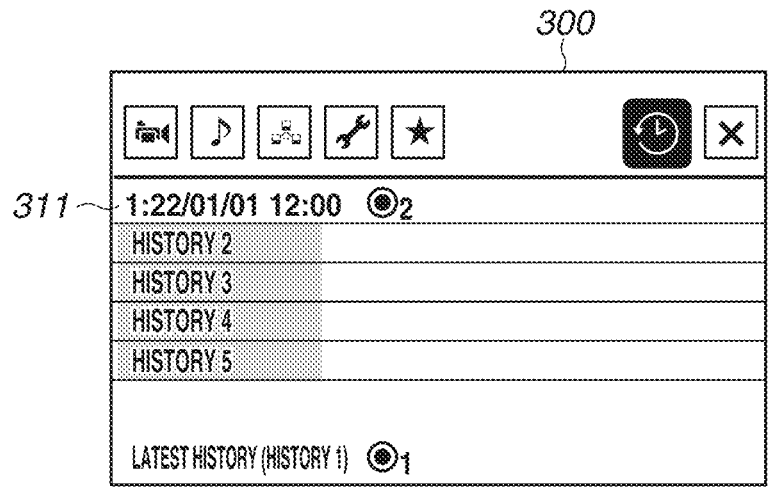
Figure 3H:
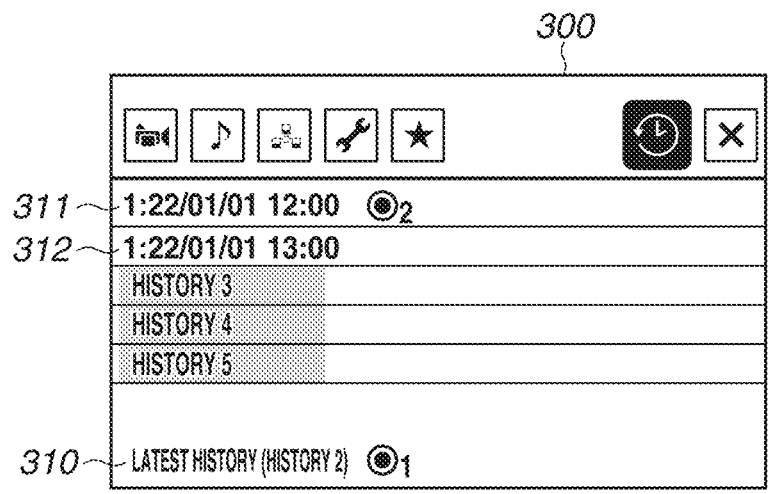

If the set button is operated during the display of FIG. 3D or 3E, the assignment menu 320 is displayed as illustrated in FIG. 3F. The imaging settings of the selected imaging setting history can be assigned to an assignment button using the assignment menu 320. If the user selects an assignment button to assign the imaging settings of the selected imaging setting history on the assignment menu 320 using the directional pad and presses the set key, the processing of step S203 to be described below is performed. The processing of step S203 assigns the selected assignment button the function of calling the imaging settings of the selected imaging setting history. The imaging settings of the user-specified imaging setting history can thus be assigned to the assign button using the assignment menu 320. As illustrated in FIG. 3G, imaging setting history (1) 311 is then displayed along with an icon indicating the assigned assignment button (assignment button 2). An imaging setting history assigned to an assignment button is thus displayed with a numbered assignment button icon, whereby the user can find out that the imaging setting history is assigned to an assignment button and what number of assignment button the imaging setting history is assigned to.

FIG. 3H illustrates the imaging setting history screen indicating a state where next imaging is started in the state of FIG. 3G and the imaging settings are registered with imaging setting history (2) 312 through the processing of steps S206 and S207. The history number is incremented by one each time imaging is performed, and the imaging setting information about the imaging setting history is stored into the system memory 116.

Returning to the flowchart of FIG. 2, in step S202, the system control unit 109 determines whether an imaging setting history is assigned to an assignment button by the user via the assignment menu 320 on the imaging setting history screen. If any one of the imaging setting histories stored in respective imaging operations (imaging setting histories (1) to (5) 311 to 315 associated with history numbers) is assigned to an assignment button (IMAGING SETTING HISTORY OF USER-SPECIFIED HISTORY NUMBER in step S202), the processing proceeds to step S203. If the latest imaging setting history is assigned to an assignment button (LATEST IMAGING SETTING HISTORY in step S202), the processing proceeds to step S204. If no imaging setting history is assigned (NO in step S202), the processing proceeds to step S205.

In step S203, the system control unit 109 assigns the assignment button selected on the assignment menu 320 the function of calling the imaging settings of the imaging setting history of the history number selected by the user on the imaging setting history screen. Here, the assignment button to be assigned and the assigned function is stored into the system memory 116 in association with each other as assignment information. For example, identification information about the assignment button and the history number of the imaging setting history are stored in association with each other as the assignment information. The processing proceeds to step S205.

In step S204, the system control unit 109 assigns the assignment button selected on the assignment menu 320 the function of calling the imaging settings of the latest imaging setting history. In step S204, the function is assigned so that not the imaging settings of a specific history number but the imaging settings of the latest imaging setting history upon the operation of the assignment button are set to the digital video camera 10. Being of the latest imaging setting history, the imaging settings to be applied to the digital video camera 10 upon the operation of the assign button change each time imaging is started and the latest imaging setting history is updated. The system control unit 109 stores the assigned assignment button and the assigned function into the system memory 116 in association with each other as assignment information. For example, the identification information about the assignment button and the information indicating that the assigned function is the function of calling the imaging settings of the latest imaging setting history are stored in association with each other as the assignment information. That the assigned function is the function of calling the imaging settings of the latest imaging setting history may be indicated by storing history number 0 that is non-existent as a history number of an imaging setting history.

In step S205, the system control unit 109 determines whether the REC button of the operation unit 111 is operated by the user to issue an instruction to start recording. If the REC button is operated (YES in step S205), the processing proceeds to step S206. If the REC button is not operated (NO in step S205), the processing proceeds to step S208. While the REC button is described to be operated to start recording, other operations may be used. For example, the operation to start recording may be determined to be made when recording is started by an external device that is a video output destination connected to the digital video camera 10 via an SDI or HDMI® cable. While not illustrated in this flowchart, processing for capturing and recording a moving image is started in response to the operation to start recording. The system control unit 109 performs processing for generating moving image data by applying various types of processing to the video data captured by the imaging unit 102 from the operation to start recording to an operation to end recording using the video processing unit 103 and the codec 104, and recording the generated moving image data on the recording medium 120 as a moving image file. In step S206, the system control unit 109 increments and updates the history number indicating the latest imaging setting history among the pieces of imaging setting history information stored in the system memory 116. If the history number indicating the latest imaging setting history is null, the system control unit 109 updates the history number to 1. The processing proceeds to step S207.

In step S207, the system control unit 109 stores the current imaging settings into the system memory 116 as imaging setting history information with the history number of the latest imaging setting history updated in step S206. The system memory 116 can store imaging setting history information for a plurality of history numbers. If the memory area for the imaging setting history information is limited, the memory area may be configured as a ring buffer to limit the number of history numbers stored. The processing proceeds to step S208. In steps S206 and S207, the current imaging settings during image recording (at the start of recording of the moving image) are thus registered with the system memory 116 as imaging setting history information, and information indicating that the registered imaging setting history information is the latest imaging setting history is stored as well. The processing for automatically storing the imaging setting history information in steps S206 and S207 is performed each time the REC button is operated to start recording a moving image.

In step S208, the system control unit 109 determines whether an assignment button (any one of assignment buttons 1 to 4) of the operation unit 111 is operated by the user. If an assignment button is determined to be operated (YES in step S208), the processing proceeds to step S209. If not (NO in step S208), the processing returns to step S202.

In step S209, the system control unit 109 refers to the assignment information stored in the system memory 116, and controls the components of the digital video camera 10 to perform the function assigned to the operated assignment button. The processing proceeds to step S202.

In step S209, if the function assigned to the operated assignment button is not an imaging setting history, the function is performed. If the function assigned to the operated assignment button is an imaging setting history, the following processing is performed.

The system control unit 109 determines the history number of the imaging setting history assigned to the number of the operated assignment button from the assignment information stored in the system memory 116. If the history number of the assigned imaging setting history is a normal one (any one of history numbers (1) to (5)), the system control unit 109 reads the imaging settings corresponding to the history number from the imaging setting history information in the system memory 116. The system control unit 109 sets the read imaging settings as those of the digital video camera 10 to reflect the imaging setting history. The system control unit 109 then controls display of a notification screen as illustrated in FIG. 4B on the display unit 121 to notify the user that the function of calling the imaging settings registered as the imaging setting history is performed by operating the assignment button and the imaging settings are changed.

If the imaging setting history assigned to the operated assignment button does not have a normal history number but is the latest imaging setting history, the system control unit 109 identifies the history number corresponding to the latest imaging setting history from the imaging setting history information in the system memory 116. The system control unit 109 then reads the imaging settings of the history number corresponding to the latest imaging setting history from the imaging setting history information in the system memory 116, and sets the imaging settings as those of the digital video camera 10 to reflect the imaging settings of the latest imaging setting history on the digital video camera 10. The system control unit 109 then displays a notification screen as illustrated in FIG. 4A on the display unit 121 to notify the user that the function of calling the latest imaging setting history, i.e., the imaging settings at the previous imaging operation is performed by operating the assignment button and the imaging settings are changed.

The imaging settings stored in the system memory 116 as an imaging setting history include a plurality of imaging settings, such as a recording format, resolution, frame rate, recording mode, and codec (compression method). The plurality of imaging settings is set to the digital video camera 10 based on the operation of the assignment button.

Figure 4A:
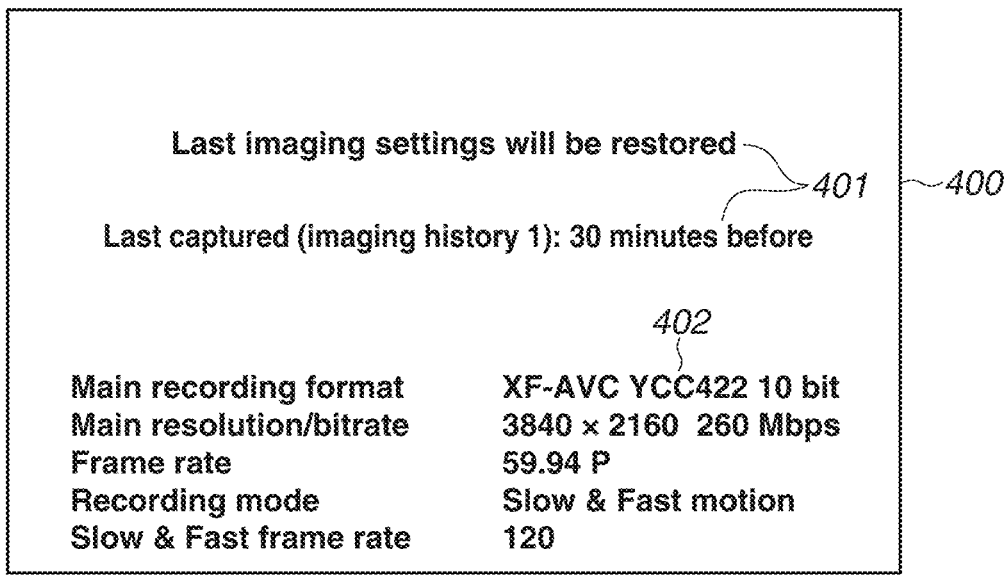
FIGS. 4A and 4B illustrate examples of guide display when an assignment button is operated.
Figure 4B:
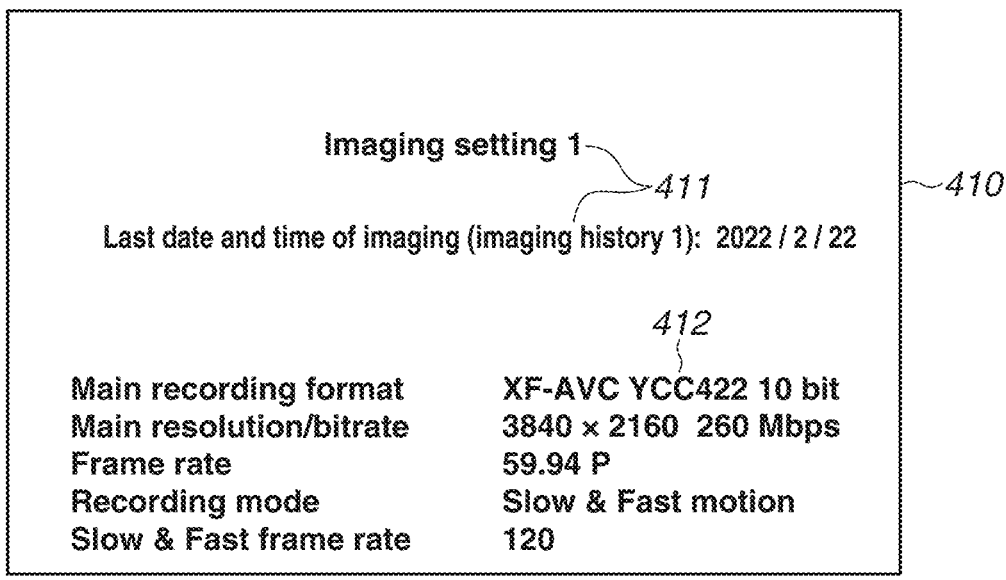

FIG. 4A illustrates an example of guide display 400 to be displayed when the imaging settings of the latest imaging setting history are read. This guide display 400 is superimposed on a live-view image. FIG. 4B illustrates an example of guide display 410 to be displayed when imaging history 1 (imaging setting history (1) 311) is read. This guide display 410 is superimposed on a live-view image. The guide display 400 and the guide display 410 are displayed on the display unit 121. To clearly show the user the called imaging setting history, the guide display 400 and the guide display 410 may display a guide message 401 and a guide message 411 illustrated in FIGS. 4A and 4B, respectively. Latest-history imaging settings 402 and history-numbered imaging settings 412 are also displayed as respective imaging settings. When the latest imaging setting history is read, the guide message 401 may include a time difference of the imaging history from the current time. In displaying the latest-history imaging settings 402 or the history-numbered imaging settings 412, changes made to the imaging settings may be displayed in different character color or different font to clarify the differences from the imaging settings before the setting change. In the present exemplary embodiment, the imaging settings to be stored in the system memory 116 as an imaging setting history include a recording format, resolution, frame rate, recording mode, and codec (compression method). Such pieces of information are displayed as the latest-history imaging settings 402 or the history-numbered imaging settings 412.

In the foregoing exemplary embodiment, operation when an assigned assignment button is pressed has been described. However, a plurality of functions may be performed depending on the pressing manner. For example, if a button is pressed for a specific period of time or less (short-pressed), imaging settings may be called. If the button is pressed for more than the specific period of time (long-pressed), the function of displaying an imaging setting history screen, such as illustrated in FIG. 3H, may be performed.

If the latest imaging setting history is called by operating an assignment button and the same assignment button is then operated again before image recording is started, the imaging settings immediately before the latest imaging setting history is called by operating the assignment button may be restored. In such a case, the imaging settings before the call are temporarily stored into the system memory 116 in calling the latest imaging setting history in response to the first operation of the assignment button. When the assignment button is operated again, the imaging settings before the operation of the assignment button temporarily stored in the system memory 116 are called and set to the digital video camera 10. The previous imaging settings can be easily restored by operating the same assignment button. The current imaging settings and the imaging settings of the latest imaging setting history can be switched in succession using a single assignment button by repeating the operation on the same assignment button. Desired imaging settings can thereby be reflected while checking differences between the imaging settings. The same may apply to an assignment button to which the function of calling an imaging setting history is assigned with a history number specified. The imaging settings before the function of calling the imaging setting history is performed using the assignment button may be restored in response to the operation on the same assignment button.

The foregoing various types of control described to be performed by the system control unit 109 may be implemented by a piece of hardware. A plurality of pieces of hardware (for example, a plurality of processors or circuits) may control the entire digital video camera 10 by sharing processing.

While the exemplary embodiment of the present disclosure has been described in detail, the present disclosure is not limited to this specific exemplary embodiment, and various modes not departing from the gist of the present disclosure are also included in the present disclosure. The foregoing exemplary embodiment is merely one exemplary embodiment of the present disclosure.

An exemplary embodiment of the present disclosure is not limited to an imaging apparatus main body and also applicable to a control apparatus that communicates with an imaging apparatus (including a network camera) via wired or wireless communication and remotely controls the imaging apparatus. Examples of the apparatus that remotely controls the imaging apparatus include devices, such as a smartphone, a tablet personal computer (PC), and a desktop PC. The control apparatus can remotely control the imaging apparatus by notifying the imaging apparatus of commands to perform various operations and make various settings based on operations performed on the control apparatus and processing performed by the control apparatus. The control apparatus may be configured to receive a live-view image captured by the imaging apparatus via wired or wireless communication and display the live-view image.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-191865, filed Nov. 30, 2022, which is hereby incorporated by reference herein in its entirety.

What is claimed is:

1. An imaging apparatus comprising:
   an image recording unit configured to record an image captured and obtained by an imaging unit;
   a storage unit configured to store an imaging setting when the image recording unit records the image as an imaging setting history, the storage unit being configured to store a plurality of imaging setting histories;
   an operation member; and
   an assignment unit configured to assign the operation member a function of calling the imaging setting of one of the imaging setting histories stored in the storage unit based on a user operation,
   wherein the assignment unit is configured to be assignable the operation member a function of calling the imaging setting of a latest imaging setting history upon operation of the operation member among the imaging setting histories stored in the storage unit based on a user operation.

2. The imaging apparatus according to claim 1, wherein the assignment unit is configured to assign the operation member a function of calling the imaging setting of a user-specified imaging setting history among the plurality of imaging setting histories or the function of calling the imaging setting of the latest imaging setting history upon the operation of the operation member instead of the user-specified imaging setting history among the plurality of imaging setting histories.

3. The imaging apparatus according to claim 2, wherein the assignment unit is configured to, in a state where no imaging setting history is stored in the storage unit, assign the operation member not the function of calling the imaging setting of the user-specified imaging setting history among the plurality of imaging setting histories but the function of calling the imaging setting of the latest imaging setting history upon the operation of the operation member.

4. The imaging apparatus according to claim 1, wherein the storage unit is configured to, when the image recording unit records the image, store the imaging setting as an imaging setting history and store information indicating that the imaging setting history is the latest imaging setting history.

5. The imaging apparatus according to claim 1, further comprising a control unit configured to, in a case where the function of calling the imaging setting of the latest imaging setting history is assigned to the operation member by the assignment unit, control to set the imaging setting of the latest imaging setting history upon the operation of the operation member among the plurality of imaging setting histories stored in the storage unit to the imaging apparatus based on the operation of the operation member.

6. The imaging apparatus according to claim 5, wherein the storage unit is configured to, when the image recording unit records the image, store the imaging setting as an imaging setting history and store information indicating that the imaging setting history is the latest imaging setting history.

7. The imaging apparatus according to claim 5, wherein the control unit is configured to, in a case where the function of calling the imaging setting of the latest imaging setting history is assigned to the operation member by the assignment unit, control to set the imaging setting of the latest imaging setting history among the plurality of imaging setting histories stored in the storage unit to the imaging apparatus and temporarily to store an imaging setting of the imaging apparatus before the imaging setting of the latest imaging setting is set to the imaging apparatus based on the operation of the operation member, and control to set the temporarily stored imaging setting to the imaging apparatus based on re-operation of the imaging member.

8. The imaging apparatus according to claim 2, comprising a plurality of operation members,
wherein the assignment member is configured to assign each of the operation members the function of calling the imaging setting of the user-specified imaging setting history among the plurality of imaging setting histories or the function of calling the imaging setting of the latest imaging setting history instead of the user-specified imaging setting history among the plurality of imaging setting histories.

9. The imaging apparatus according to claim 1, further comprising a display control unit configured to control to display an imaging setting history screen on a display unit, the imaging setting history screen on which the imaging setting histories stored in the storage unit are checkable.

10. The imaging apparatus according to claim 9, wherein the display control unit is configured to control to display information corresponding to the plurality of imaging setting histories and information for identifying the latest imaging setting history among the plurality of imaging setting histories on the imaging setting history screen.

11. The imaging apparatus according to claim 9, further comprising a selection unit configured to select an imaging setting history from the plurality of imaging setting histories displayed on the imaging setting history screen.

12. The imaging apparatus according to claim 11, wherein the display control unit is configured to control to display the imaging setting of the imaging setting history selected by the selection unit on the imaging setting history screen.

13. The imaging apparatus according to claim 9,
wherein the assignment unit is configured to assign the operation member a function of calling the imaging setting of a user-specified imaging setting history among the plurality of imaging setting histories or the function of calling the imaging setting of the latest imaging setting history instead of the user-specified imaging setting history among the plurality of imaging setting histories, and
wherein the display control unit is configured to control to display items corresponding to the plurality of imaging setting histories on the imaging setting history screen, and in a case where the function of calling the imaging setting of the user-specified imaging setting history is assigned to the operation member, control to display an item corresponding to the imaging setting history assigned to the operation member on the imaging setting history screen along with information indicating that the function of calling the imaging setting history is assigned to the operation member.

14. The imaging apparatus according to claim 13,
wherein the display control unit is configured to control to display information for identifying the latest imaging setting history among the plurality of imaging setting histories on the imaging setting history screen, and
wherein the display control unit is configured to, in a case where the function of calling the imaging setting of the latest imaging setting history is assigned to the operation member, control to display the information for identifying the latest imaging setting history on the imaging setting history screen along with information indicating that the function of calling the imaging setting of the latest imaging setting history is assigned to the operation member.

15. The imaging apparatus according to claim 9, comprising a plurality of operation members,
wherein the assignment unit is configured to assign each of the operation members a function of calling the imaging setting of a user-specified imaging setting history among the plurality of imaging setting histories or the function of calling the imaging setting of the latest imaging setting history instead of the user-specified imaging setting history among the plurality of imaging setting histories, and
wherein the display control unit is configured to control to display the imaging setting history screen so that an operation member to which a function of calling an imaging setting is assigned among the plurality of operation members and the imaging setting history assigned to the operation member are identified.

16. The imaging apparatus according to claim 15, wherein the display control unit is configured to control to display an icon on the imaging setting history screen, the icon being configured to identify the operation member to which the function of calling the imaging setting of the imaging setting history is assigned.

17. The imaging apparatus according to claim 11, wherein the display control unit is configured to control to display a screen configured to assign the operation member a function of calling the imaging setting of the imaging setting history selected by the selection unit based on a predetermined operation made on display of the imaging setting history screen.

18. The imaging apparatus according to claim 17,
wherein the display control unit is configured to control to display a plurality of items each corresponding to a corresponding imaging setting history of the plurality of imaging setting histories and an item indicating the latest imaging setting history on the imaging setting history screen, and
wherein the selection unit is configured to select one of the items each corresponding to the corresponding imaging setting history of the plurality of respective imaging setting histories or the item corresponding to the latest imaging setting history.

19. The imaging apparatus according to claim 1,
wherein the storage unit is configured to store a plurality of imaging settings as one imaging setting history, and
wherein in a case where a function of calling the imaging settings of the one imaging setting history is assigned to the operation member by the assignment unit, the plurality of imaging settings stored as the one imaging setting history is controlled to be set to the imaging apparatus based on operation of the operation member.

20. A non-transitory computer-readable storage medium storing a program for causing an imaging apparatus including an operation member to execute a method, the method comprising:
- recording an image captured and obtained by an imaging unit;
- storing an imaging setting when the image recording unit records the image as an imaging setting history, wherein a plurality of imaging setting histories can be stored;
- assigning the operation member a function of calling the imaging setting of at least one of the stored imaging setting histories;
- wherein assigning the operation member includes assigning a function of calling the imaging setting of a latest imaging setting history upon operation of the operation member from among the stored imaging setting histories.

* * * * *